United States Patent [19]

Runaldue

[11] Patent Number: 5,469,437
[45] Date of Patent: Nov. 21, 1995

[54] NETWORK CHIP WITH AUTO SENSING AND RECONFIGURATION

[75] Inventor: Thomas J. Runaldue, San Jose, Calif.

[73] Assignee: Advanced Micro Devices, Inc., Sunnyvale, Calif.

[21] Appl. No.: 897,731

[22] Filed: Jun. 12, 1992

[51] Int. Cl.$^6$ .................................................. H04L 12/413
[52] U.S. Cl. ............................................ 370/85.3; 340/825.5
[58] Field of Search ................................. 370/13, 16, 16.1, 370/85.1, 85.3; 340/825.5, 825.03, 825.06, 825.16; 371/11.1, 11.2

[56] References Cited

U.S. PATENT DOCUMENTS 5,249,183  9/1993  Wong et al. ............................ 370/85.3

*Primary Examiner*—Wellington Chin

[57] ABSTRACT

Method and apparatus for enabling a local area network controller circuit to automatically select 10Base-T port data if the 10Base-T port data satisfies the IEEE 802.3 standard Link Test Pass requirement, and if the Link Test Pass indicates that the 10Base-T data is invalid, the controller switches automatically to connect a 10Base 2 or 5 coax port to the terminal.

3 Claims, 9 Drawing Sheets

PRIOR ART

NETWORK CHIP WITH AUTO SENSING AND RECONFIGURATION

FIELD OF THE INVENTION

This invention relates to integrated circuit architecture for a local area network (LAN) controller chip and in particular to a chip for interconnection to 10Base-T, 10Base5 and 10Base2 media as defined in IEEE Specification 802.3i-1990 using CSMA/CD as the network access method.

BACKGROUND OF THE INVENTION

Local area network (LAN) is the name which has been given to the equipment and protocols permitting users of computers within an organization to attach to a communication network which allows the users to share information and resources. Not only are those in nearby physical locations able to share resources such as printers and plotters and computer programs and files in memory, but with remote bridges, stations anywhere can join the network via telephone lines if they have proper access authorization. The IEEE has been developing a standard for LAN so that the equipment of various manufacturers will be interoperable. Historically, the field had developed independently for several years prior to the adoption of a standard so that a de facto standard had developed before the IEEE had proposed their standard. Accordingly, four different standards were developed for networks, each having a different method of approaching network problems; the main problem is how to recognize and deal with data collisions among the sharing nodes on the network. In this invention we are only concerned with the IEEE Std 802.3. (This standard was intended to be compatible with the network of the Xerox Company called EtherNet.) The 802.3 specification deals with data packet formation issues and collision avoidance protocol which has become known by the mnemonic CSMA/CD for Carrier-Sense Multiple Access with Collision Detection. In accordance with this scheme each station senses if there has been a collision and if so each station involved waits a random time before resending its message and uses certain sophisticated procedures to avoid multiple collisions. The IEEE 802.3 was originally developed for use with a thick coax cable bus network and called the specification for use with this cable 10Base5 because it described a baseband coaxial cable which could transmit data at 10 Mbs over a maximum distance of 500 meters between stations. Subsequently, a thinner baseband coax bus cable became used because it was less expensive and it was called 10Base2. It is specified for the same 10 Mbs but only over maximum 200 meters. Another network configuration is configured as a distributed star using inexpensive twisted-pair wire and is called 10Base-T. Again, it will operate at the same 10 Mbs but at a still less maximum distance of 100 meters. 10Base-T has a hub which can recognize when a station is faulty and can bypass that work station so that the entire network is not disrupted.

Figure 1:
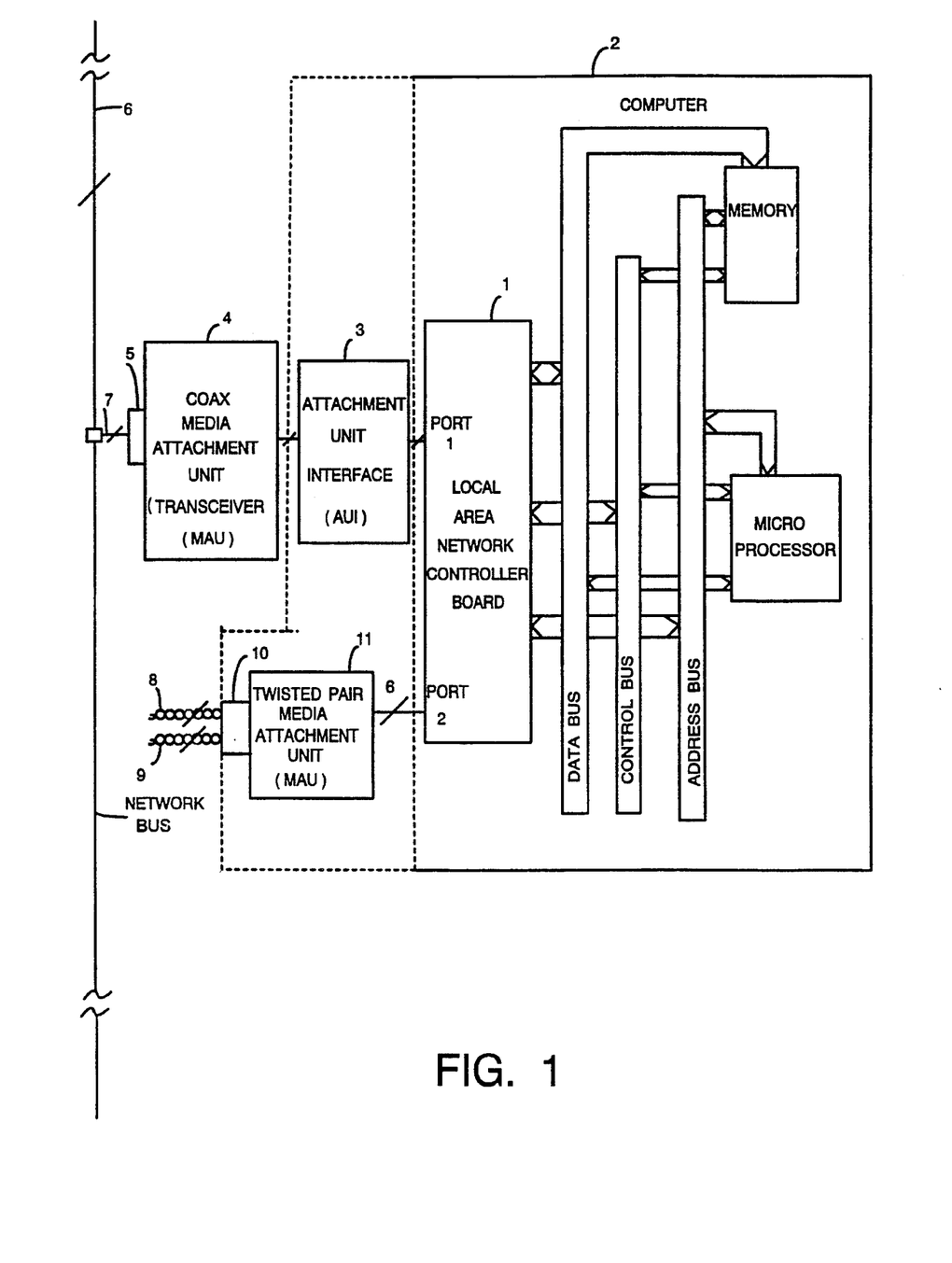
FIG. 1 is a block diagram of a prior art computer connection to a Local Area Network.

With respect to FIG. 1, the nomenclature for the physical interconnection is illustrated between a computer 2 and a Network 6. The Computer 2 contains a Local Area Network Controller Board 1 having Port 1 and Port 2. Port 1 is shown connected to coax media 7 for 10Base2 or 10Base5. Port 2 is shown connected to a pair of twisted pair cables 8 and 9.

The IEEE 802.3 standard requires that the physical media, either coax or twisted wire are connected to a Media Attachment Unit (MAU) via connector 5 and 10 respectively. The connectors are called Medium-Dependent Interface (MDI). The IEEE Specification requires for the coax media, because it is required to exhibit high voltage isolation, that the MAU 4 be connected to another unit called an Attachment Unit Interface (AUI) 3. The IEEE specification does not require a separate AUI between the LAN Controller Board 1 and the twisted pair 10Base-T MAU 11. In existing LAN systems it is known to separate units interconnected as shown in FIG. 1 or to combine the MAU and AUI units into the computer so that it is convenient for the user to simply connect their cables into the connectors (MDI) 5 and 10 on the back of the LAN Controller Board 1.

Figure 2A:
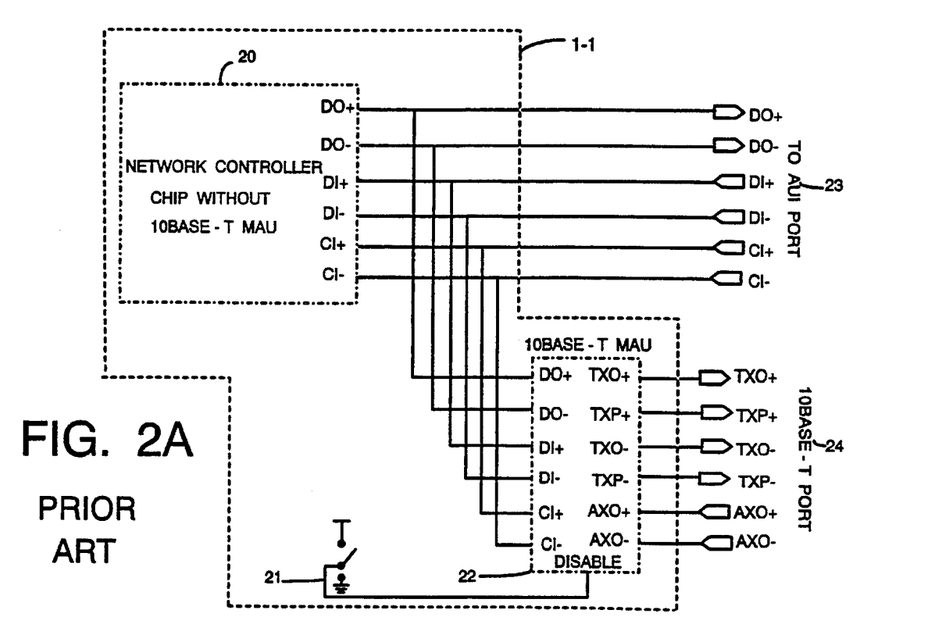
FIGS. 2A and 2B are prior art IEEE 802.3 Network Controller Chip, coax and twisted pair ports interfaces.
Figure 2B:
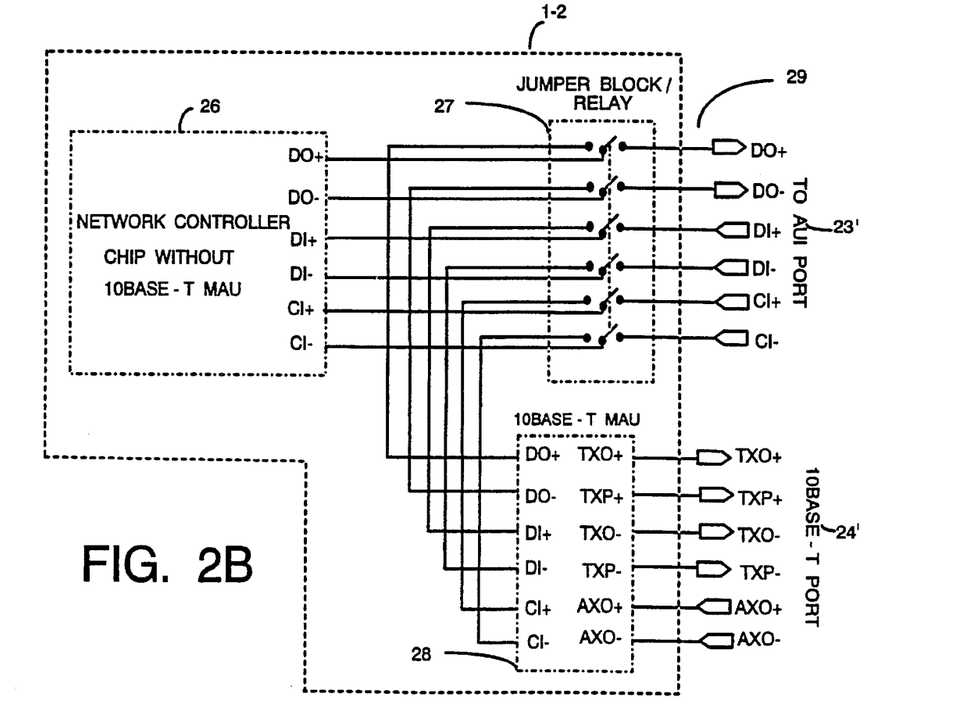

With reference to FIG. 2A and FIG. 2B, prior integrated circuit network controller chips 20 and 26 have been mounted and connected differently to the coax ports for an AUI and the 10Base-T ports. These differences have caused certain ambiguities and problems. Since both 10Base2, 10Base5 and 10Base-T employ the same 802.3 collision detection protocols, it has been the practice to employ a single Network Controller Integrated Circuit 20 and 26 on a Network Controller Board and to require the user to take certain steps when it is determined which type of media is going to be used. As illustrated in connection with FIG. 2A, if the user is going to connect to coax which are to be accessed via the AUI Port 23, then the switch 21 must be activated to apply a high on the 10Base-T MAU 22 disable circuit to disconnect the 10Base-T port. However, if the 10Base-T port 24 is selected by de-energizing switch 21, if through error any signals are subsequently introduced from coax through the AUI port 23 they will contend with the 10Base-T data in an illegal manner. Accordingly, in the configuration of FIG. 2A, the AUI port 23 must be left open or problems can occur.

In reference to FIG. 2B, the selection between the coax port 23' and the 10Base-T port 24' is taken care of by the use of a jumper block 27. When the user makes the decision as to which media his system will be connected to, it is necessary for the user to install or remove the jumper across the jumper block 27 to make the required port interconnections to the chip and to open the other port.

This problem has made it more difficult for users to connect their systems and for integrated circuit designers. Also, it would be more convenient to include the MAU circuitry for the 10Base-T into the integrated circuit but because of the user selection requirement, this integration has not been able to be accomplished before my invention.

SUMMARY OF THE INVENTION

It is an object of my invention to provide logic and sensing circuitry into an 802.3 integrated circuit network controller chip which automatically senses whether a connected twisted-pair port is properly active and if so, to configure the logic within the chip itself to operate in the 10Base-T configuration. If the link is inactive, then the AUI port is selected. This is possible because the CSMNCD protocol requires sending of idle link pulses on the network if message data is not being sent. Accordingly, the receiver should always be active if the port is properly connected.

A feature of my invention is that my network controller integrated circuit chip includes the MAU functions for the 10Base-T media and eliminates the requirement for the user to set switches or jumper buses to configure the network system for the selected port.

DETAILED DESCRIPTION OF THE INVENTION

Figure 3:
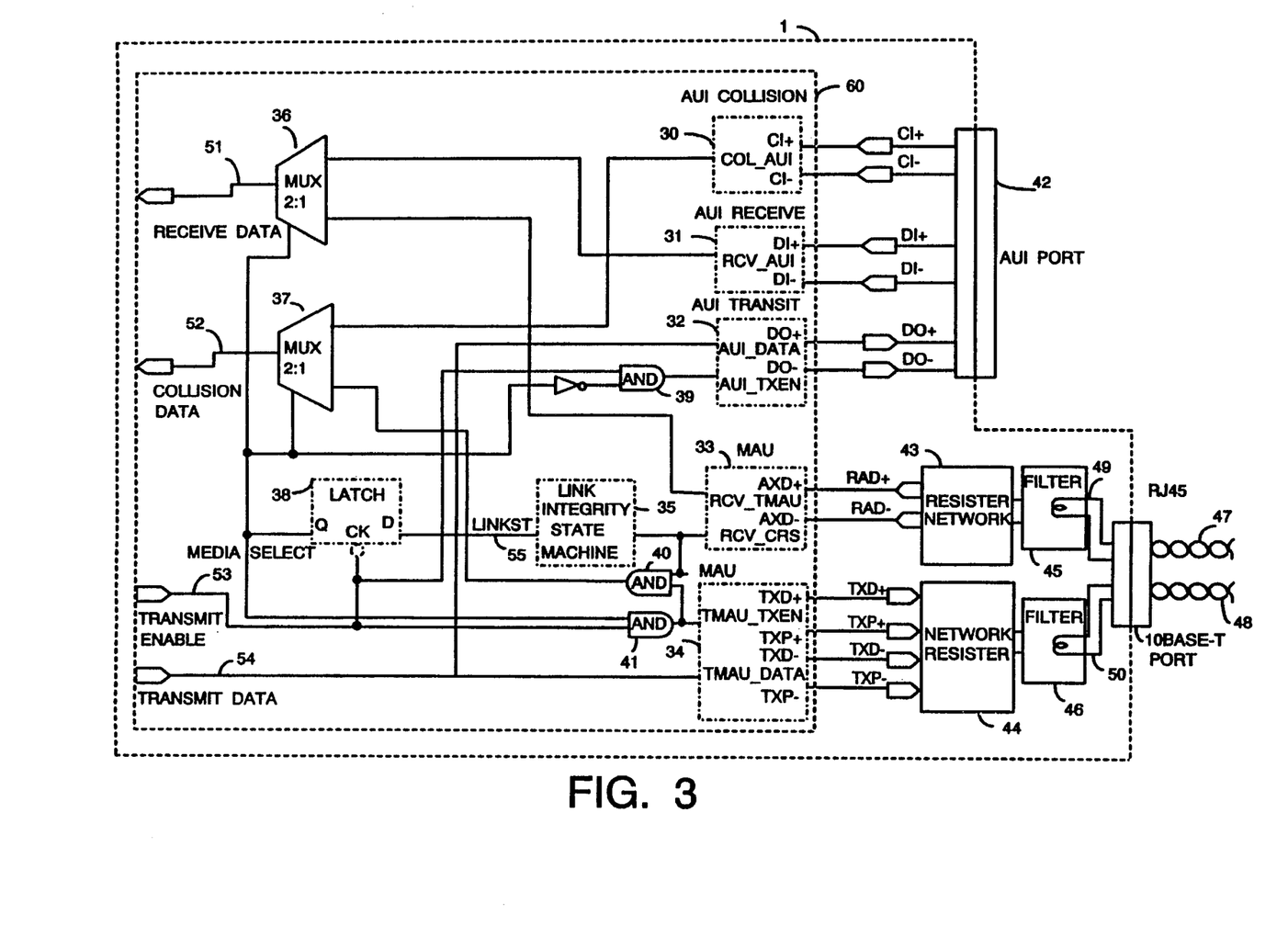
FIG. 3 is a block diagram of an embodiment of my transceiver invention.
Figure 5A:
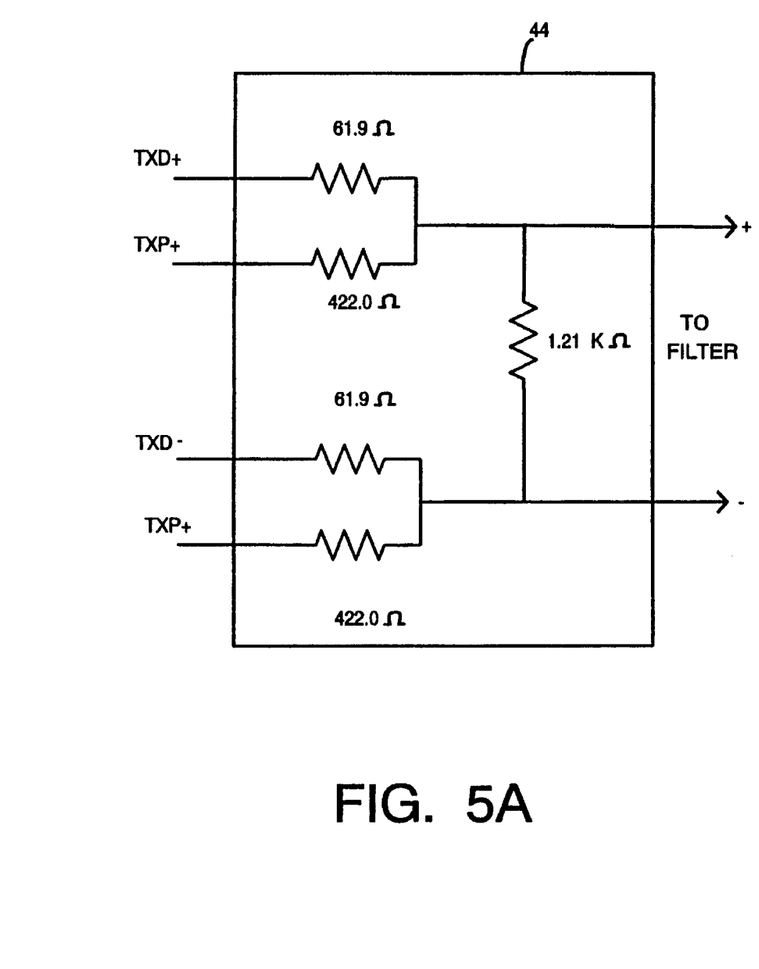
FIGS. 5A and 5B are details of the resistor matching network for 10Base-T MAU interconnection.
Figure 5B:
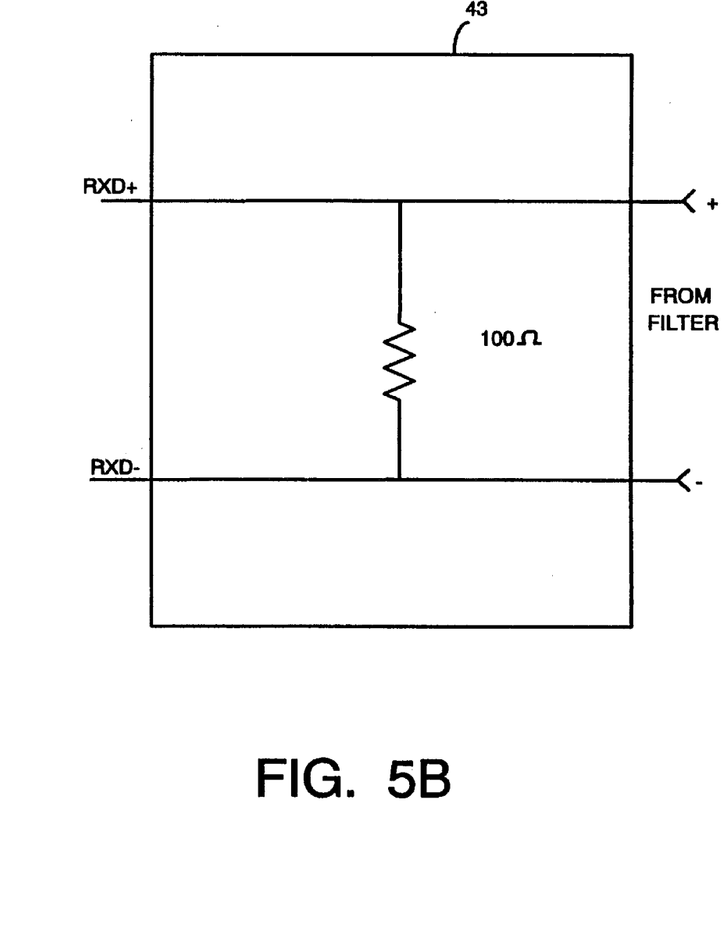
Figure 6A:
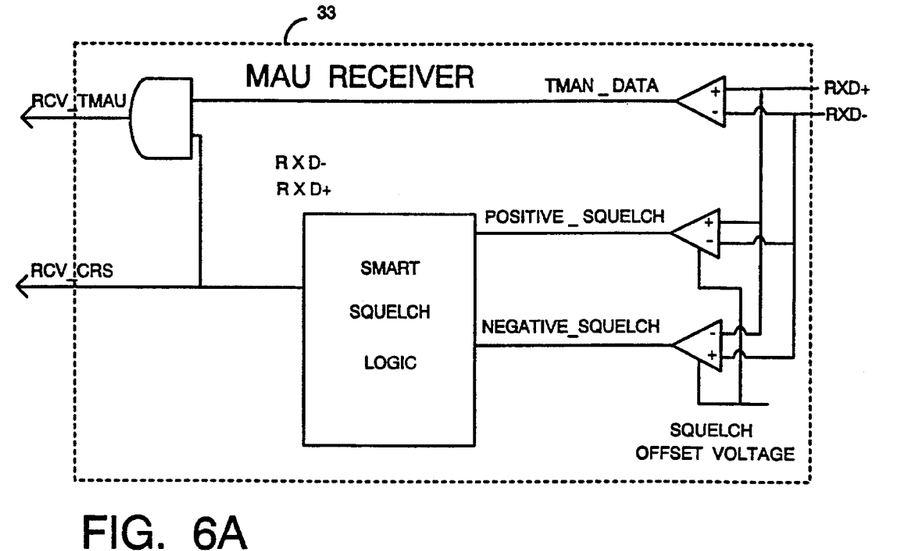
FIGS. 6A and 6B are MAU receiver and MAU transmitter circuits.

With reference to FIG. 3, the block diagram of the novel transceiver integrated circuit 60 of this invention discloses IC 60 as a portion of Local Area Network Controller Circuit Board 1. Coaxial media would be connectable to the Board 1 via an Attachment Unit Interface (not shown) which would connect to the AUI port 42. Twisted pair media 47 and 48 via the connector RJ45 would be mounted to the Circuit Board 1 via the 10Base-T port. As required by IEEE Std 803.2, the wires connected to the twisted pairs are connected via 49 and 50 respectively to RF filters 45 and 46 thence through the resistor networks 43 and 44 which are also defined by the standard and shown is FIG. 5A and FIG. 5B respectively. The integrated transceiver chip of my invention includes the standard MAU receiver circuit 33 and MAU transmitter circuit 34 which characteristics are defined by the IEEE Std 802.3. The receiver 10Base-T standard requires that the receiver have the ability to transfer Manchester encoded data from the receive data RD circuit to the Receive data output. Receiver MAU circuit 33 is shown in detail in FIG. 6A.

Figure 6B:
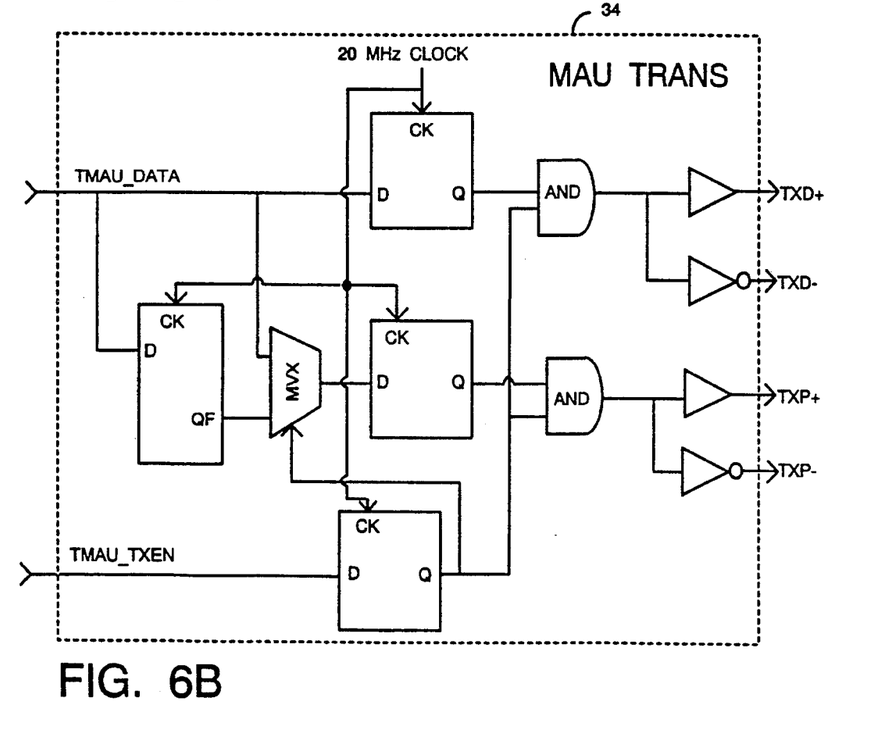

The transmitter circuit 34 is also fully specified by the IEEE Std 802.3 and one implementation is shown in detail in FIG. 6B.

Figure 7A:
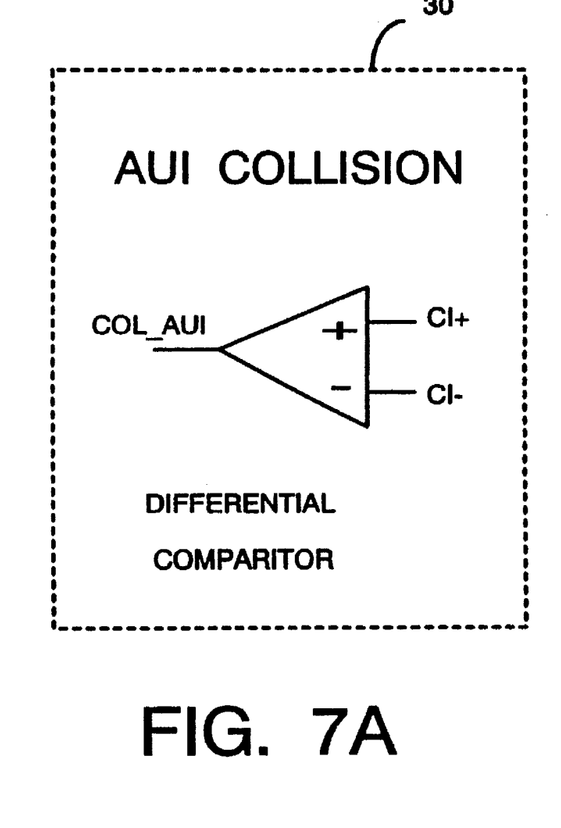
FIGS. 7A, 7B and 7C are AUI collision receiver and transmitter circuits respectively.

The IEEE specification has also fully defined the specification for the AUI collision circuit 30 and one implementation is shown in FIG. 7A.

Figure 7B:
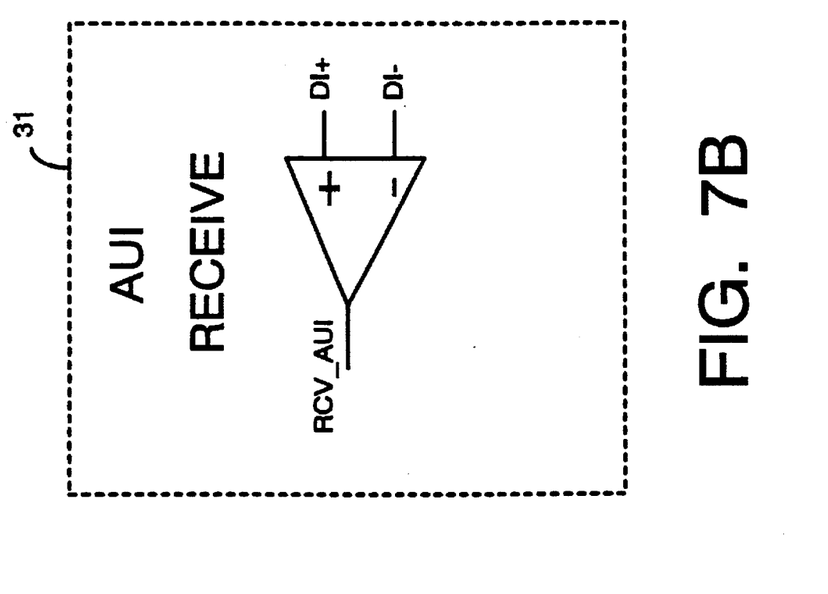
Figure 7C:
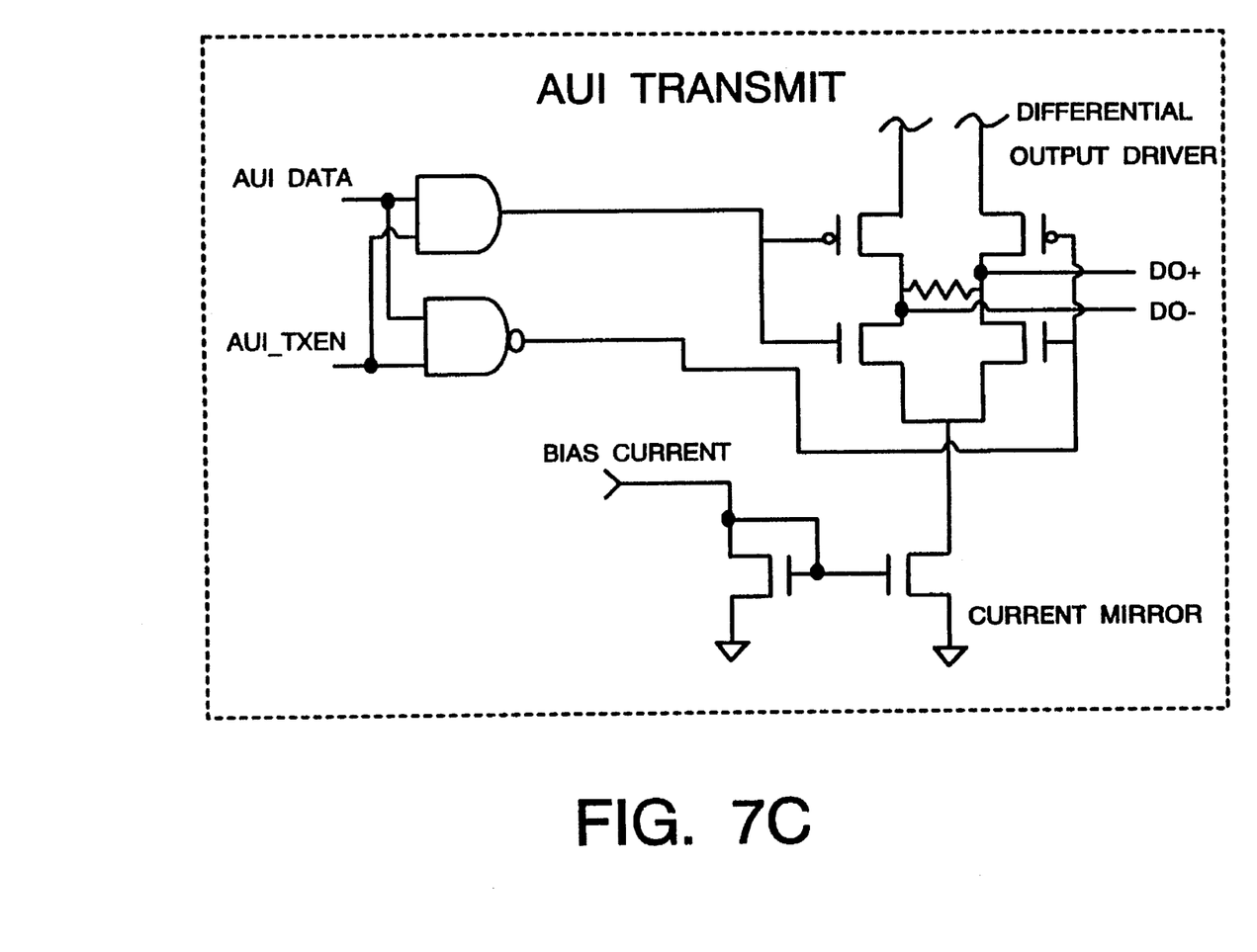

The IEEE specification 802.3 also fully specifies the AUI Receiver 31 and AUI transmitter 32 and an implementation of these circuits is shown in detail in FIG. 7B and FIG. 7C respectively. The circuits of FIG. 6A and 6B and 7A, 7B and 7C do not comprise details which are claimed as part of my invention. These circuits are disclosed to comply with the requirement to explain the invention and to disclose the Best Mode to carry out the invention.

The port switching logic of FIG. 3 relies on the operation of the Link Integrity State Machine 35. When the Receiver MAU 33 recognizes an active receiver at the 10Base-T port input, it enables RCV_CRS high to the Link Integrity State Machine 35. If the State Machine confirms proper data, as explained subsequently, the Link Integrity State Machine 35 asserts a command LNKST high, and if the transmit enable line is not enabled, the latch 38 will set and the Q output of latch 38 will set MUX 36 and MUX 37 to send the 10Base-T data receiver out on line 51, and the 10Base-T collision data out on line 52. Also, the Q output of latch 38 is connected to AND gate 41 such that when transmit enable 53 is asserted, the AND gate 41 output will enable MAU transmitter 34 to connect Transmit Data on line 54 out on the twisted-pair 48 to the network. During a transmission of idle signals, even if no information is received for a specified time, the receiver MAU 33 will always assert the RCV_CRS signal during the duration of idle pulses if the wires to the line are properly connected and the circuit is working. If RCV_CRS stays deasserted for a period longer than "link loss" as defined in IEEE 802.3 10 BASE-T Specification, p. 28, the LNKST is deasserted, the Latch 38 resets, the MUXes 36 and 37 switch and the AND gate 39 will gate AUI transmit circuit 32 into the active state. Accordingly, the circuit 60 will automatically sense whether the 10Base-T port is active and if not, it will cause itself to switch to the AUI port for the 10Base2 or 10Base5 coax circuit network connection.

Figure 8:
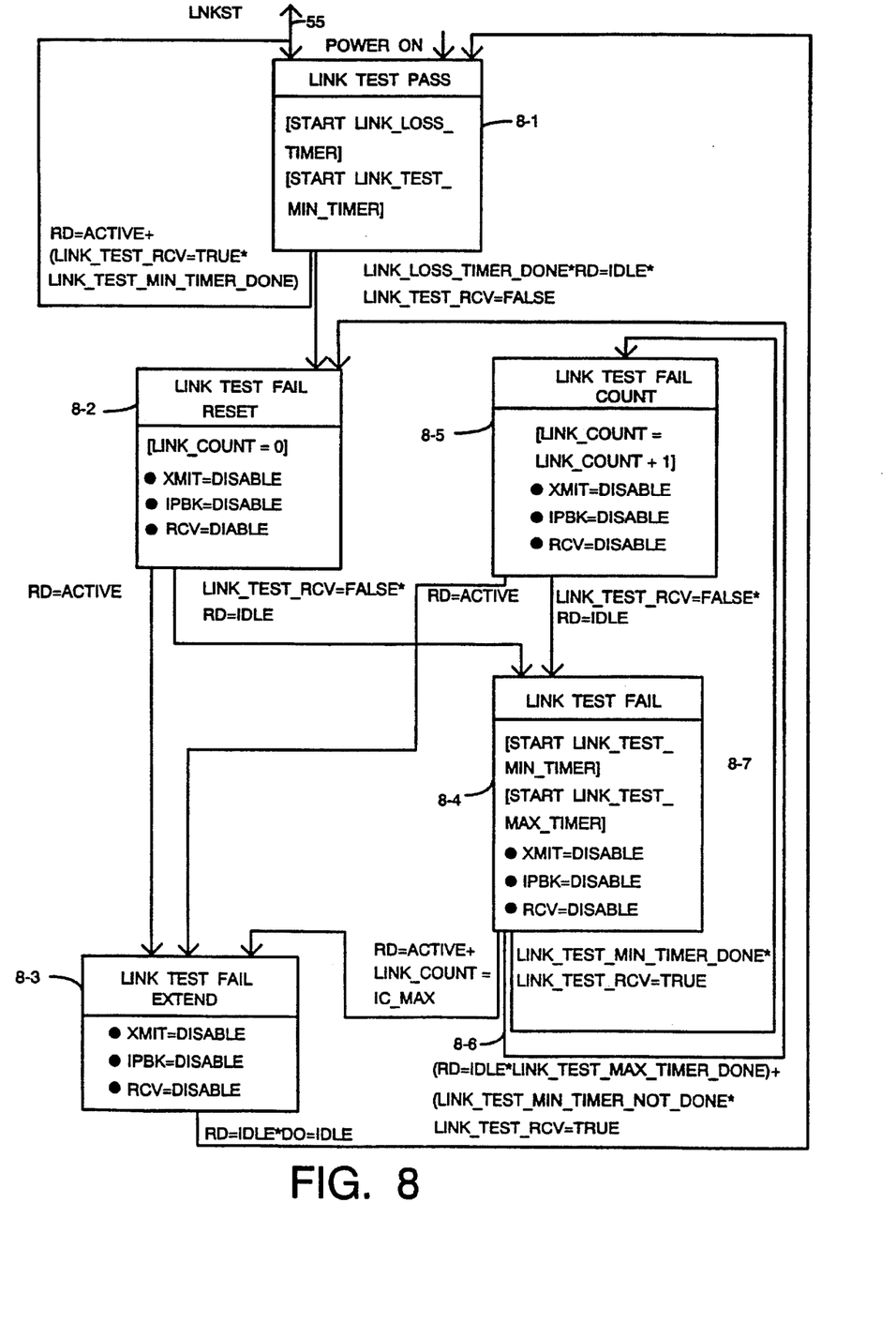
FIG. 8 is a flow diagram for the Link Integrity logic as specified by IEEE 803.2.

FIG. 8 is the IEEE function specified for the logic of the Link Integrity State Machine 35. If the Link test pass is true, the LNKST 55 signal is asserted and the 10Base-T port is selected. In block 8-1, two timers are started, the link_loss_timer and link_test_min_timer. Pulses which are received before the link_min_timer has expired are ignored and are not recorded as valid link pulses. A link pulse received after link_min and before link_loss are valid link pulses. At every valid link pulse, the link_loss_timer is reset. Link_min_timer is reset after every link pulse. If pulses are received which are farther apart than the Link_test_min_timer then the RD active is asserted after consecutive link_max_count has been exceeded and LNKST is sent. If one of the conditions fail, the logic of block 8-2 commences and the link counter is set to zero and the Xmit, loop back and receiver functions are disabled. If the receiver senses active pulses, the logic switches to block 8-3. If not, the loop assumes it should be waiting for the idle pulses and the logic goes to block 8-4. In block 8-4, the timers are started: the link_test_min_timer and the link_test_max_timer. If the pulses are too close together or the max timer is done and pulses are not received, the logic will start back at block 8-2 as indicated on line 8-6. If pulses are received and pulses are not too close together, the logic will jump back to 8-5 via path 8-7.

Figure 4:
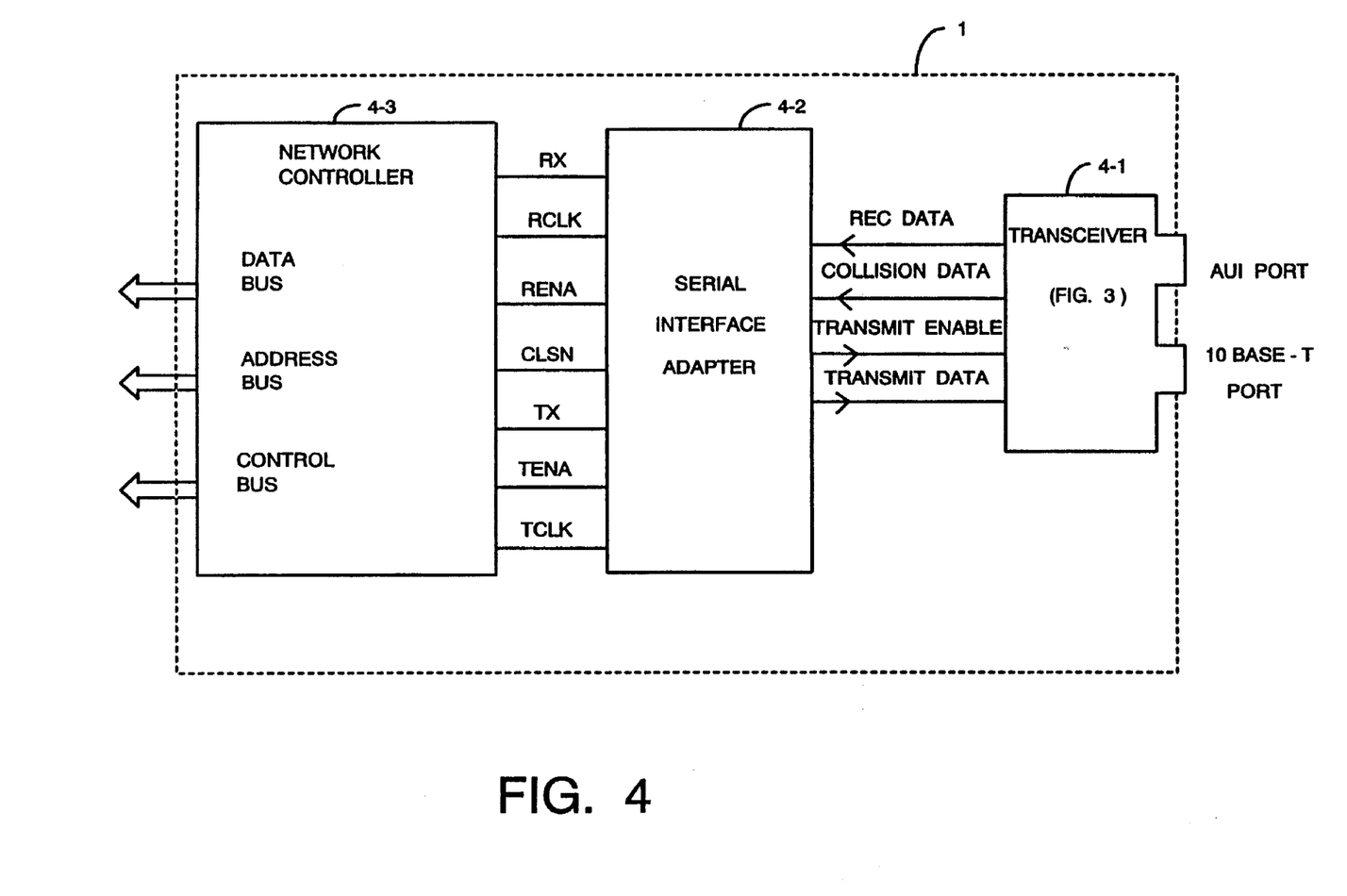
FIG. 4 is a block diagram showing an alternative interconnection of the transceiver of this invention and other IC circuits to complete a local area Network Control Circuit Board for connecting into a computer.

As illustrated in FIG. 4, the transceiver of this invention could also be made a part of a separate IC 4-1 which could be connected to existing circuits 4-3 such as Serial Interface Adapter (AM7992B) for connection to existing Network Controller Chips (AM7990) for controlling and automatically implementing a Local Area Network.

The FIGS. 6A, 6B, 7A, 7B, 7C and 9 disclose the details of prior art circuits for carrying out the functions specified by the IEEE specification and are included herein for completeness.

This invention has been explained in connection with embodiments of the Figures. However, it is not the intention that the inventors be limited to these embodiments but that the scope of the invention be measured by the claims.

With the above in view,

What is claimed is:

1. In a first circuit for coupling local area network signals to a second circuit for controlling the interchange of data between said local area network and the data bus of a computer in accordance with IEEE specification 802.3, said first circuit including AUI collision, AUI receive and AUI transmit circuits coupled to an AUI port for receiving 10Bbase2 or 10Base5 coax media, the improvement comprising:

a 10Base-T MAU, said 10 Base-T MAU being incorporated into said first circuit, said 10Base-T MAU including input and output terminals, said input and output terminals being a 10Base-T port, said 10Base-T MAU including a receiver MAU and a transmitter MAU;

circuit means for sensing whether valid signals are being received from said 10Base-T port, wherein said circuit means for sensing includes a state machine for performing the logic of the Link Test Pass as defined by the IEEE 802.3 standard specification, said state machine providing an output LINST signal for asserting whether or not the Link Test Pass is being currently achieved and for providing a valid signal indication when said Link Test Pass is being achieved;

means responsive to said valid signal indication from said circuit means for sensing to cause the signals from said 10Base-T port to be output from said 10Base-T port to said second circuit if valid signals are received from said 10Base-T ports or if said signals from said 10Base-T port are not valid, to output signals from said AUI port to said second circuit; and wherein said means responsive to said valid signal indication includes a pair of switches, said pair of switches being responsive to assertion of said valid signal received signal to select 10Base-T port information.

2. The circuit of claim 1 further including a latch, said latch being connected to and responsive to said state machine output LNKST signal and wherein said switches are multiplexer circuits, and wherein said multiplexers are responsive to the output of said latch.

3. The circuit of claim 2 including an AND circuit, said AND circuit being coupled on its input to the receiver MAU output which is indicative of receipt of pulses from said 10BaseT port and where a second input to said AND gate is transmit enable said output of said AND circuit being asserted true as a collision indicator to one of said MUXes.

* * * * *